(12) United States Patent
Kitamura et al.

(10) Patent No.: US 10,827,747 B2
(45) Date of Patent: Nov. 10, 2020

(54) ANTI-BACTERIAL AND ANTI-FUNGAL PHOTOCATALYTIC COATING FILM AND METHOD FOR PRODUCING THEREOF

(71) Applicant: Universiti Brunei Darussalam, Gadong (BN)

(72) Inventors: Toru Kitamura, Gadong (BN); Nur Fajrini Binti Matjalina, Gadong (BN); Haji Mohammad Redza Bin Haji Hussin, Gadong (BN)

(73) Assignee: UNIVERSITI BRUNEI DARUSSALAM, Gadong (BN)

( * ) Notice: Subject to any disclaimer, the term of this patent is extended or adjusted under 35 U.S.C. 154(b) by 30 days.

(21) Appl. No.: 15/672,081

(22) Filed: Aug. 8, 2017

(65) Prior Publication Data
US 2018/0035667 A1 Feb. 8, 2018

(30) Foreign Application Priority Data
Aug. 8, 2016 (BN) .................. BN/N/2016/0063

(51) Int. Cl.
| | |
|---|---|
| *A01N 25/34* | (2006.01) |
| *C09D 127/14* | (2006.01) |
| *C09D 127/16* | (2006.01) |
| *C09D 127/18* | (2006.01) |
| *C09D 127/04* | (2006.01) |
| *A01N 59/20* | (2006.01) |
| *C09D 127/22* | (2006.01) |
| *C08F 2/46* | (2006.01) |
| *C08F 14/18* | (2006.01) |
| *C01G 49/02* | (2006.01) |
| *C01G 23/047* | (2006.01) |
| *C01G 19/02* | (2006.01) |
| *C01G 9/02* | (2006.01) |
| *C08F 14/02* | (2006.01) |
| *B22F 1/00* | (2006.01) |

(52) U.S. Cl.
CPC ............. *A01N 25/34* (2013.01); *A01N 59/20* (2013.01); *C09D 127/04* (2013.01); *C09D 127/14* (2013.01); *C09D 127/16* (2013.01); *C09D 127/18* (2013.01); *C09D 127/22* (2013.01); *B22F 1/0011* (2013.01); *B22F 2001/0066* (2013.01); *B22F 2301/10* (2013.01); *C01G 9/02* (2013.01); *C01G 19/02* (2013.01); *C01G 23/047* (2013.01); *C01G 49/02* (2013.01); *C08F 2/46* (2013.01); *C08F 14/02* (2013.01); *C08F 14/18* (2013.01)

(58) Field of Classification Search
None
See application file for complete search history.

(56) References Cited

U.S. PATENT DOCUMENTS

| 2010/0221518 A1* | 9/2010 | Sasaki | B01J 35/004 428/220 |
| 2011/0143924 A1* | 6/2011 | Hisata | C09D 5/1618 502/159 |
| 2014/0106961 A1* | 4/2014 | Nakai | B01J 37/0219 502/159 |
| 2017/0252801 A1* | 9/2017 | Ida | H01B 5/00 |

* cited by examiner

Primary Examiner — Robert T Butcher
(74) Attorney, Agent, or Firm — Sinorica, LLC

(57) ABSTRACT

The present invention relates to a photocatalytic coating film composition and method for producing thereof. More specifically, it relates to an acidic anti-mould and anti-fungal photocatalytic coating film formed by the decomposition and evaporation of the volatile organic base from the photocatalytic coating composition after the application and the drying on substrate. The photocatalytic coating liquid composition consisting of a strong acidic nature of Nafion with pH<2 as an indispensable binder resin; a volatile organic base to neutralize the acidic binder resin temporarily and photocatalysts to generate strong oxidizing compounds which decompose harmful organic compounds and also to provide protection for the acidic environment by decomposing neutralizing chemicals from outside.

11 Claims, No Drawings

ANTI-BACTERIAL AND ANTI-FUNGAL PHOTOCATALYTIC COATING FILM AND METHOD FOR PRODUCING THEREOF

RELATED APPLICATION

This application claims the benefit of Brunei Application No. BN/N/2016/0063 filed on Aug. 8, 2016 and entitled "Anti-Bacterial and Anti-Fungal Photocatalytic Smart Coating", the content of which is incorporated in its entirety herein by reference.

FIELD OF THE INVENTION

The present invention relates to a photocatalytic coating liquid composition and method for producing thereof. More specifically, it relates to an acidic anti-mould and anti-fungal photocatalytic coating film formed by the decomposition and evaporation of the volatile organic base from the photocatalytic coating composition after its application and drying on substrate.

BACKGROUND OF THE INVENTION

There has been extensive research and development on techniques for protecting buildings, walls, or surfaces exposed to external environment from bacteria, mould, germs and fungal growth. Conventionally, photocatalytic reaction due to photocatalytic coating composition has long been regarded as an effective tool against the growth of mold, fungus and germs as well.

When the photocatalytic coating is applied on to a substrate expecting an anti-bacterial and anti-fungal effect, moisture in the surrounding air is adsorbed in coating surface due to super hydrophilicity properties of the photocatalyst thus giving rise to a drawback that the growth of bacteria or mold is promoted.

U.S. Pat. No. 8,568,870 patent discloses a building material and a method for coating a substrate for the building material with a coating film having a variety of functions relating to an environment such as mildew resistance, deodorization, antibacterial activity and air purification in addition to the anti-staining effect by having an excellent hydrophilicity.

US patent application US 2011/0143924 describes a photocatalyst coating composition to be formed as a coating film after being applied to a substrate and dried. The application further provides a photocatalyst coating composition comprising a graft copolymer of PTFE, a photocatalyst material, and a fluororesin.

However, in reality, the photocatalytic coating composition developed so far failed to control the growth of bacteria, mould, and germs in building walls and surface as it turned out to be too weak to be called effective from the industrial level and some measures to combine with a pure photocatalytic reaction supplement or to strengthen it, has been tried and investigated with virtually no fruitful results so far.

There has been urgent need to develop a novel acidic anti-mould and anti-fungal photocatalytic coating film formed by decomposition and evaporation of the volatile organic base from the mixture of the photocatalytic coatings after its application on substrate and the drying process.

OBJECT OF THE INVENTION

Accordingly, one object of the present invention is to provide a photocatalytic coating liquid composition.

Other object of the present invention is to provide an acidic photocatalytic coating film formed by decomposition and evaporation of the volatile organic base from the photocatalytic coating composition after the application and the drying on substrate.

Another object of the present invention is to provide a combination of acidic fluororesin, volatile organic base and photocatalysts for producing a coating composition having anti-mould and anti-fungal properties.

Yet another object of the present invention is to provide a method of producing a liquid composition that can be used for smart coating for anti-bacterial and anti-fungal applications.

One more object of the present invention is to provide a photocatalytic coating composition in liquid form comprising strong acidic organic binder.

One further object of the present invention is to produce a photocatalytic coating film that generates strong oxidizing compounds by the decomposition of harmful organic compounds.

One further object of the present invention is to amplify the photocatalytic effect against mould, fungus and germs by adding metallic copper powder.

Yet another object of the present invention is to develop a photocatalytic coating film for protection of the acidic environment by the decomposition of neutralizing chemicals from outside environment.

Yet another object of the present invention is to provide a photocatalytic coating composition that is safe and stable against photocatalytic reaction and UV from the sunlight.

Other objects and advantages of the present invention will be more apparent from the following description which is not intended to limit the scope of the present invention.

SUMMARY OF THE INVENTION

In one aspect, the present invention relates to an acidic anti-mould and anti-fungal photocatalytic coating film and a method for producing the same. In one embodiment, the acidic anti-mould and anti-fungal photocatalytic coatings films formed by the decomposition and evaporation of the volatile organic base from the mixture of the photocatalytic coatings after the application and the drying process.

In another aspect, the photocatalytic coating liquid comprising a strong acidic nature of organic binder having pH<2 as an indispensable binder resin of which almost all mould spores could not survive in such acidic environment; a volatile organic base to neutralize the acidic binder resin temporarily and photocatalysts to generate strong oxidizing compounds which decompose harmful organic compounds and also to provide protection for the acidic environment by decomposing neutralizing chemicals from outside. As a result, we have accomplished the sole photocatalytic coating film adequately effective against mold and fungus in the world by their combination. In one embodiment, the anti-fungus and anti-mold effect is further strengthened by adding metallic copper powder with sufficiently enough durability.

In further aspect, there is provided a photocatalytic coating liquid composition comprising up to 75 weight percent of a photocatalyst, up to 60 weight percent of a strong acidic resin binder having pH equal or less than 2, up to 1.0 weight percent of volatile base, up to 2 weight percent of copper powder and up to 98 weight percent of solvents including additives. By applying 100 g/m² of this liquid on a flat substrate we can obtain dried film of 0.5-4.0 micron thickness. In some embodiment, the photocatalysts generate strong oxidizing compounds which decompose harmful organic compounds and provide protection for the acidic environment by decomposing neutralizing chemicals from outside.

DETAILED DESCRIPTION OF THE INVENTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "including" is used to mean "including but not limited to." "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are described in this disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, physics, and the like, which are within the skill of the art. Such techniques are explained fully in the literature.

In one aspect, the objectives of the present invention can be achieved by forming a photocatalyst coating liquid that combines photocatalyst with reactive chemicals of caustic nature. In some embodiment the coating is formed as a coating film after being applied to a substrate and dried, and can amplify the photocatalytic effect against them. In some embodiment, the photocatalytic coating liquid is combination of a strongly acidic fluororesin, volatile organic base, photocatalysts and metallic copper powder as indispensable components for the mold and fungus resistant coating.

In one aspect, there is provided a photocatalytic coating film composition comprising a photocatalyst, an organic binder having strong acidic nature, a volatile base compound, and solvents including additives required for the desired product. In one of the embodiments the composition can be in liquid state which, when applied on a substrate, forms a coating film on getting dried.

The example of photocatalyst material includes but not limited to TiO2, ZnO, WO3, SnO2, SrTiO3, Bi2O3, and Fe2O3. In some embodiment, the photocatalyst material may be in porous.

In some embodiment, the photocatalyst may be used in amount about 0.01 wt. %, about 0.05 wt. %, about 0.1 wt. %, about 2 wt. %, about 5 wt. %, about 10 wt. %, about 20 wt. %, about 30 wt. %, about 40 wt. %, about 50 wt. %, about 60 wt. %, about 70 wt. %, about 80 wt. %, from 0.01 wt. %, to 5 wt. %, from 3 wt. % to 10 wt. %, from 8 wt. % to 25 wt. %, from 15 wt. % to 45 wt. %, from 35 wt. % to 65 wt. %, from 55 wt. % to 85 wt. % of the coating composition and ranges between any two of these values. However, other amounts are possible. The particular amount depends upon the desired properties of the coating composition and the environment of substrate so as to provide effective photocatalyst function. In a preferred embodiment, the photocatalyst is used in amount from about 0.05 wt. % to about 55.0 wt. %.

In some embodiment, a few chemical compounds may alternatively be used as photocatalyst. Example of such photocatalyst may be selected from, but not limited to, inorganic ultraviolet absorbing agents such as zinc oxide, titanium oxide, cerium oxide, tungsten oxide, strontium titanate, bismuth oxide, iron oxide, or the like, organic ultraviolet absorbing agents such as benzotriazole, salicylic acid, benzophenone, or light stabilizers such as hindered amine.

In one aspect, the organic binder has strong acidic nature having pH value not more than 2. In some embodiment the organic binder is at least one selected from the group consisting of PVDF, PVF, PTFE, ETFE, PVDF-HFP, PCTFE, trifluorochloroethylene-alkyl vinyl ether copolymer, tetrafluoroethylene-alkyl vinyl ether copolymer, and trifluoro chloroethylene-alkyl vinyl ether-alkyl vinyl ester copolymer.

In a preferred embodiment, the organic binder resin is a graft copolymer of polytetrafluoroethylene (PTFE) and perfluorosulfonic acid that has graft polymerized Sulfonic acid ($SO_3H$). The commercial organic binder being used in the present coating film is Nafion of E. I. Du Pont.

The resin binder included in the photocatalyst coating composition of the present invention employs the resin that is not degraded by photocatalyst and accordingly provides flexibility to the coating film. However, in a photocatalytic reaction, reaction energy might cut C—H bonds, as described above. For this reason, it is preferable to use the organic resin binder that includes C—H bonds as few as possible and includes a molecular skeleton composed of C—F bonds or the like, which include a high binding energy. Hence, Nafion, which includes perfluorosulfonic acid and PTFE, is preferable. (US 2011/0143924 A1) The generally accepted chemical structure of this kind of resin is as follows.

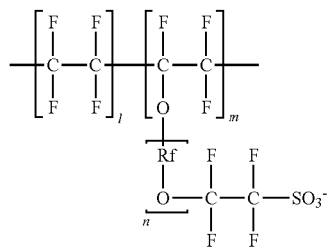

In some embodiment, the organic binder resin may be used in amount about 0.01 wt. %, about 0.05 wt. %, about 0.1 wt. %, about 0.15 wt. %, about 2 wt. %, about 2.5 wt. %, about 3 wt. %, about 3.5 wt. %, about 4.5 wt. %, about 5 wt. %, about 7 wt. %, about 10 wt. %, of the photocatalytic coating composition and ranges between any two of these values. However, other amounts are possible. The particular amount depends upon the desired properties of the coating composition and the environment of substrate. In a preferred embodiment, the binder is used in amount from about 1 wt. % to about 5 wt. %.

In one aspect, the volatile base used in the present invention is an organic compound. In some embodiment, the volatile base compound includes at least one selected from the group consisting of methanol, ethanol, propyl alcohol, alkylamine, and alkylamino alcohol. In a one embodiment, the volatile base used in the present invention is at least one selected from the group consisting of diethylamine, triethylamine, dimethylamine, trimethylamine, diethylaminoethanol, dimethylaminoethanol and ethylenediamine. In a preferred embodiment, the volatile base is used in amount up to 3 wt. % of the coating composition.

The metallic copper powder adopted here should be fine enough to prevent the formation of quick precipitation on the bottom of the container as well as obtaining enough surface area for the reaction. Namely its maximum particle size of the copper powder should be less than 45 micron, which corresponds to 325 mesh fineness of the sieve. By adding this powder in amount up to 5 wt. percent, preferably about 2 wt. percent, the expected anti-bacterial and anti-fungal effect are further improved.

Miscellaneous additives such as silicone defoamer and silane coupling agent can be added to this composition to improve the applicability and adhesion.

In some embodiment, the solvent and additives are used in amount about 30 wt. %, about 35 wt. %, about 40 wt. %, about 50 wt. %, about 65 wt. %, about 70 wt. %, about 75 wt. %, about 85 wt. %, about 90 wt. %, about 95 wt. %, about 97 wt. %, and ranges from about 30 wt. % to about 45 wt. %, from about 35 wt. % to about 60 wt. %, from about 55 wt. % to about 80 wt. %, from about 80 wt. % to about 95 wt. % of the photocatalytic coating composition and ranges between any two of these values. However, other amounts are possible. The particular amount depends upon the desired properties of the coating composition and the environment of substrate. In a preferred embodiment, the volatile base is used in amount from about 0.3 wt. % to about 3.0 wt. %.

In one aspect, there is provided an acidic anti-mould and anti-fungal photocatalytic coatings films formed by the decomposition and evaporation of the volatile organic base from the mixture of the photocatalytic coatings after the application and the drying process.

The photocatalytic coating liquid consisting of Nafion with pH less than 2 as an indispensable binder resin of which almost all mould spores could not survive in such acidic environment; a volatile organic base to neutralize the acidic binder resin temporarily and photocatalysts to generate strong oxidizing compounds which decompose harmful organic compounds and also to provide protection for the acidic environment by decomposing neutralizing chemicals from outside. As a result, we have accomplished the sole photocatalytic coating film adequately effective against mold and fungus in the world by their combination.

In further aspect, there is provided a photocatalytic coating film composition comprising 0.05 to 55.0 weight percent of a photocatalyst, 1.0 to 5.0 weight percent of nafion resin in terms of nonvolatile solid as binder having pH<2, up to 3.0 weight percent of volatile base comprising an organic compound selected from the group consisting of ammonia, diethylamine, triethylamine, dimethylamine, trimethylamine, diethylaminoethanol, dimethylaminoethanol and ethylenediamine, and 39.0 to 95.5 wt. % of solvents including additives, wherein the photocatalysts generate strong oxidizing compounds which decompose harmful organic compounds and provide protection for the acidic environment by decomposing neutralizing chemicals from outside.

In accordance to one aspect, the catalytic coating liquid composition is used for forming a film on substrate by applying and then drying the photocatalyst coating material composed of the photocatalyst coating composition of the present invention.

In accordance to one embodiment, the photocatalyst coating composition is composed of strong acidic fluororesin, volatile organic base, photocatalysts and metallic copper powder as indispensable components. The coating film is formed by drying and removing a solvent of the photocatalyst coating composition by volatilization. The photocatalyst particles may be dispersed in the binder layer that has the organic resin binder and the fluororesin.

In some embodiment, method of coating of the photocatalytst coating composition comprising coating a substrate with the photocatalyst coating liquid produced by the aforesaid method. In some embodiment, the coating method may include first mixing the photocatalyst and Nafion together and then adding the fluororesin as an aqueous dispersion to the mixture. In some embodiment, first photocatalyst powder is dispersed into nafion by a suitable disperser and then solvents composed of volatile organic alcohol are added and mixed thoroughly to make the composition. In some embodiment, water and other solvent may be used to the mixture or blend.

In some embodiment, the present invention can be combined with photocatalyst and other reactive chemicals of caustic nature to amplify the photocatalytic effect against them.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Example 1

A basic formulation as claimed in the present disclosure is prepared by mixing 10 g of photocatalyst powder solution with 30 g of Nafion DE520 which is then dispersed thoroughly with a disperser for about 1 hour. Nafion DE521 is 5 wt. % solution with 50 wt. %1-propanol and 45 wt. % water that means 30 g of Nafion comprises 1.5 g nafion solid, 15 g 1-propanol and 13.5 g water. Then adding 40 g water and 18 g ethanol, 2 g trimethylamine to get 100 g mixture, followed by mixing the whole ingredients thoroughly until homogeneous solution is obtained. Resulted solution consists of 1 g photocatalyst powder, 1.5 g solid Nafion, 15 g of 1-propanol, 62.5 g of water, 18 g of ethanol and 2 g of trimethylamine. The pH of the solution is 8-9. This solution is applied on an acryl sheet and is dried in the atmosphere for 24 hours.

Example 2

In this example Copper powder is added as the ingredient. The formulation is made by mixing 10 g of photocatalyst powder solution "Celmuse" by Daicel Corp. with 30 g of Nafion DE520 and disperse them thoroughly with a disperser for 1 hour. Celmuse is 10 wt. % aqueous solution of photocatalyst that means 10 g of it comprises 1 g photocatalyst powder and 9 g water. Nafion DE521 is 5 wt. % solution with 50 wt. %1-propanol and 45 wt. % water that means 30 g of comprises 1.5 g nafion solid, 15 g 1-propanol and 13.5 g water. Then adding 40 g water, 16 g ethanol and 1 g of metallic copper and finally 2 g of triethyl amine to get 100 g mixture, followed by mixing the whole ingredients thoroughly until homogeneous solution is obtained. Resulted solution consists of 1 g photocatalyst powder, 1.5 g solid Nafion, 15 g of 1-propanol, 62.5 g of water, 17 g of ethanol and 3 g of diethylamino ethanol. The pH of the solution is 8-9. This solution is applied on an acryl sheet and is dried in the atmosphere for 24 hours to serve for the mold-control and other testing.

Example 3 a formulation, without neutralization is prepared herein by mixing 10 g of photocatalyst powder solution "Celmuse" by Daicel Corp. with 30 g of Nafion DE520 and disperse them thoroughly with a disperser for 1 hour. Celmuse is 10 wt. % aqueous solution of photocatalyst that means 10 g of it comprises 1 g photocatalyst powder and 9 g water. Nafion DE521 is 5 wt. % solution with 50 wt. %1-propanol and 45 wt. % water that means 30 g of comprises 1.5 g nafion solid, 15 g 1-propanol and 13.5 g water. Adding 40 g water and 20 g ethanol to get 100 g mixture. Mixing the whole ingredients thoroughly until homogeneous solution is obtained. Resulted solution consists of 1 g photocatalyst powder, 1.5 g solid Nafion, 15 g of 1-propanol, 62.5 g of water, and 20 g of ethanol. The pH of the solution is greater than 2. This solution is applied on an acryl sheet and is dried in the atmosphere for about 24 hours. This sample is further used for the mold-control and other testing.

Example 4

A comparative example is provided by neutralizing the base compound with nonvolatile base. The formulation is prepared by mixing 10 g of photocatalyst powder solution "Celmuse" by Daicel Corp. with 30 g of Nafion DE520 and dispersing them thoroughly with a disperser for 1 hour. Celmuse is 10 wt. % aqueous solution of photocatalyst that means 10 g of it comprises 1 g photocatalyst powder and 9 g water. Nafion DE521 is 5 wt. % solution with 50 wt. %1-propanol and 45 wt. % water that means 30 g of comprises 1.5 g nafion solid, 15 g 1-propanol and 13.5 g water. Adding 40 g water and 18 g ethanol and finally 2 g 1 MLiOH aqueous solution to get 100 g mixture. Mixing the whole ingredients thoroughly until homogeneous solution is obtained. Resulted solution consists of 1 g photocatalyst powder, 1.5 g solid Nafion, 15 g, of 1-propanol, 64.4 g of water, 18 g of ethanol and 0.1 g of anhydrous LiOH. The pH of the solution is 8-9. About 2 g of this solution is applied on an acryl sheet and is dried in the atmosphere for 24 hours. This sample may evenly be divided into 4 pieces equal size of sheets to serve for the mold-control and other testing.

Example 5

This comparative example relates to conventional photocatalytic product. As the typical conventional photocatalyst coating liquid sold in the market we choose here "Hydrotect ECO-EX" by TOTO Ltd. This material is tested by applying 2 g of it on an acryl sheet and is dried in the atmosphere for 24 hours, and further evenly divided into 4 pieces to serve for the mold-control and other testing.

Mold-control or antifungal testing was conducted according to the way defined on JIS R 1705:2008 "Fine ceramics (advanced ceramics, advanced technical ceramics)—Test method for antifungal activity of photocatalytic products under photo irradiation".

Results are summarized in the following table. Surface pH values on the surface of the film were measured by drowning the surface with the pH detective pencil.

|  | Example 1 | Example 2 | Example 3 | Example 4 | Example 5 |
| --- | --- | --- | --- | --- | --- |
| PH of the solution | 8-9 | 7-8 | 2> | 8-9 | 8-9 |
| Surface pH After 24 hrs | 2> | 3-5 | 2> | 8-9 | 8-9 |
| Surface pH After 48 hrs | 2> | 2> | 2> | 8-9 | 8-9 |
| Antifungal activity index | 2 | 3 | 2 | 0 | 0 |

It is apparent from the data of Examples 1-3 that the present invention shows superb capability of mold-control effect in terms of antifungal activity index although in the case of Example 3 we have some difficulty to handle because of the too strong acidity of the initial solution.

Examples 4 and 5 prove the generally accepted image of photocatalyst coating that it has no mold-control function by nature.

While certain embodiments have been illustrated and described, it should be understood that changes and modifications can be made therein in accordance with ordinary skill in the art without departing from the technology in its broader aspects as defined in the following claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

We claim:

1. An acidic anti-mould and anti-fungal photocatalytic coating film composition comprising:
    a photocatalyst in amount of 0.01 to 0.05 wt. % of the photocatalytic coating film composition;
    an acidic resin as a binder in amount of 0.01-0.8 wt. % of the photocatalytic coating film composition, wherein the acidic resin has a pH value less than or equal to two;
    a volatile base in amount of 0.3 wt. % of the photocatalytic coating film composition, the volatile base applied on the binder, wherein the photocatalytic coating film is formed by the decomposition and evaporation of the volatile base after application and drying process;
    metallic copper powder in amount of 2.0 wt. % of the photocatalytic coating film composition, wherein effect of the photocatalyst is amplified based on addition of the metallic copper powder; and
    solvents and additives in amount of 97.0 wt. % of the photocatalytic coating film composition, wherein the photocatalyst generates oxidizing compounds which decompose harmful organic compounds and provide protection for an acidic environment, wherein the pH value of the photocatalytic coating film composition is in a range of 7-9.

2. The photocatalytic coating film composition of claim 1, wherein the photocatalyst comprises an inorganic or organic ultraviolet absorbing agent.

3. The photocatalytic coating film composition of claim 2, wherein the inorganic ultraviolet absorbing agent or the photocatalyst is at least one metal oxide selected from the group consisting of Titanium dioxide ($TiO_2$), Zinc Oxide (ZnO), Tungsten oxide ($WO_3$), Tin oxide ($SnO_2$), Strontium titanate ($SrTiO_3$), Bismuth (III) oxide ($Bi_2O_3$), and Iron (III) oxide ($Fe_2O_3$).

4. The photocatalytic coating film composition of claim 2, wherein the organic ultraviolet absorbing agent is at least one selected from the group consisting of benzotriazole, salicylic acid, and benzophenone.

5. The photocatalytic coating film composition of claim 1, wherein the binder is fluororesin having pH less than 2.

6. The photocatalytic coating film composition of claim 1, wherein the acidic resin is at least one selected from the group consisting of polyvinylidene fluoride (PVDF), polyvinyl fluoride (PVF), polytetrafluoroethylene (PTFE), ethylene tetrafluoroethylene (ETFE), poly(vinylidene fluoride-hexafluoropropylene) (PVDF-HFP), polychlorotrifluoroethene (PCTFE), trifluorochloroethylene-alkyl vinyl ether copolymer, tetrafluoroethylene-alkyl vinyl ether copolymer, and trifluorochloroethylene-alkyl vinyl ether-alkyl vinyl ester copolymer, wherein the acidic resin is not degraded by photocatalyst and provides flexibility to the photocatalytic coating film.

7. The photocatalytic coating film composition of claim 1, wherein the volatile base is an organic compound selected from the group consisting of methanol, ethanol, propyl alcohol, alkylamine, and alkylamino alcohol.

8. The photocatalytic coating film composition of claim 1, wherein the volatile base is at least one selected from the group consisting of diethylamine, triethylamine, dimethylamine, trimethylamine, diethylaminoethanol, dimethylaminoethanol and ethylenediamine.

9. The photocatalytic coating film composition of claim 7, wherein the volatile organic base neutralizes the acidic binder resin temporarily.

10. The photocatalytic coating film composition of claim 1, wherein the metallic copper powder comprises of particles having size equal to or less than 45 microns.

11. The photocatalytic coating film composition of claim 1, wherein application of 100 g/m2 of the photocatalytic coating film composition on a flat substrate, the photocatalytic coating film of 3.0-4.0 micron thickness is formed.

* * * * *